United States Patent [19]

Marchese

[11] Patent Number: 5,753,758

[45] Date of Patent: May 19, 1998

US005753758A

[54] FLOOR FINISHING COMPOSITION

[76] Inventor: Frank Marchese, 28 Cross St., Bronxville, N.Y. 10708

[21] Appl. No.: 794,994

[22] Filed: Feb. 5, 1997

[51] Int. Cl.$^6$ ............................................. C08L 33/02
[52] U.S. Cl. ................................. 525/201; 525/206
[58] Field of Search ................................. 525/201, 206

[56] References Cited

U.S. PATENT DOCUMENTS

| | | | |
|---|---|---|---|
| 4,371,398 | 2/1983 | Forchielli | 106/10 |
| 4,869,934 | 9/1989 | Jethwa | 427/393.5 |
| 5,055,132 | 10/1991 | Fernandez et al. | 106/11 |
| 5,191,002 | 3/1993 | Davis | 524/157 |
| 5,290,954 | 3/1994 | Roberts et al. | 549/233 |

*Primary Examiner*—Melvin I. Marquis
*Assistant Examiner*—D. Aylward

[57] ABSTRACT

Floor finishing composition which, when applied as a coating to a floor, provides a film having improved durability, toughness and gloss. The composition comprises certain acrylic copolymers and a stilbene compound.

8 Claims, No Drawings

FLOOR FINISHING COMPOSITION

FIELD OF THE INVENTION

This invention relates to floor finishing compositions, and is particularly related to compositions which, when applied to a floor, impart improved durability, toughness and gloss to the floor surface and enhances its wear resistance. More specifically, this invention relates to such compositions which contain specific acrylic polymers with or without wax, a stilbene compound and other ingredients such as coalescent agents and plasticizers.

BACKGROUND OF THE INVENTION

Floor polishing or finishing compositions are widely used in a variety of commercial buildings, educational institutions, homes and restaurants. Major considerations in selecting a floor finishing composition are the finished floor's toughness, durability, wear-resistance, i.e., its ability to withstand traffic over a prolonged period of time, gloss, and slip resistance. There are numerous products in the marketplace which meet some of these demands. Also, several patents describe floor finishing or polishing compositions with one or more of the aforementioned attributes. For example, U.S. Pat. No. 5,055,132 issued Oct. 8, 1991 describes aqueous floor coating and polishing compositions primarily for improving the gloss and depth of gloss of the finished floor surface. The primary coating and polishing agent in the composition described in the aforementioned patent is a combination of certain low molecular weight water insoluble, alkali soluble addition polymer and an alkali soluble resin.

U.S. Pat. No. 4,960,463 issued Oct. 2, 1990 discloses an aqueous floor polishing composition comprising a polymeric polish material and an alkoxylated amine surfactant. The polymeric polish material is an acrylic co-polymer.

The compositions described in the aforementioned patents, and the floor finishing compositions available in the marketplace satisfy some of the major considerations of the consumers but are still deficient or unsatisfactory with respect to other required attributes such as durability, toughness and wear resistance.

Accordingly, it is an object of the present invention to provide floor finishing compositions which exhibit superior durability, toughness and wear resistance while also exhibiting high degree of gloss and scuff resistance.

It is also an object of this invention to provide such compositions which exhibit the aforementioned attributes when applied to, i.e., they are coated on, a variety of floor surfaces.

It is yet another object of this invention to provide such compositions which can be readily applied to the floor surface and are curable at room temperature to form the desired coating.

The foregoing and other objects and features of the present invention will become more apparent from the following detailed description.

SUMMARY OF THE INVENTION

A floor finishing composition is provided which comprises:

(a) high molecular weight zinc-containing acrylic copolymer, (b) low molecular weight zinc-free acrylic copolymer, and (c) one or more stilbene compounds.

The inclusion of the stilbene compound in the composition results in, when the composition is applied to a floor surface, remarkable improvement in durability, toughness and gloss of the finished film.

DETAILED DESCRIPTION OF THE INVENTION

The floor finishing composition of the present invention comprises a film forming polymer, typically acrylic polymer, and certain stilbene compounds for providing the hardness, durability, gloss, slip resistance and other desired attributes of the surface coating. A typical formulation contains the following ingredients, in water:

(a) high molecular weight acrylic polymer, containing interlocking zinc in its molecular structure;

(b) low molecular weight, alkaline soluble resin (ASR) zinc-free acrylic polymer;

(c) stilbene compound, which is an essential ingredient of the composition and serves to form a continuous hard film of the acrylic polymer on the floor surface;

(d) coalescent agent;

(e) plasticizer;

(f) wetting agent;

(g) biocide which serves as a preservative; and (h) wetting agent.

The high molecular weight, zinc-containing acrylic polymers which are suitable in the present invention are generally known in the art as "acrylic emulsion copolymers" produced from the copolymerization of one or more of the following monomers; acrylic acid, methacrylic acid, ethyl acrylate, methyl acrylate, butyl acrylate, 2-ethyl hexyl acrylate (2-EHA), acrylonitrile, acrylamide, alkyl methacrylate wherein the alkyl group may be methyl, ethyl or butyl. The preferred acrylic copolymer for the purpose of this invention is 2-propenoic acid, 2-methyl polymer with butyl 2-propenoate, ethenylbenzene, ethyl 2-propenate, methyl 2-methyl-2-propenoate. The molecular weight of these high molecular weight polymers ranges from about 300,000 to about 1,800,000, preferably from about 400,000 to about 1,600,000. The preferred copolymer is available commercially from Interpolymer Corporation, Canton, Mass. as Syntran 1270. All molecular weights herein refer to weight average molecular weight.

The low molecular weight ASR zinc-free acrylic copolymers used in the present invention have a molecular weight ranging from about 5,000 to about 70,000 preferably from about 10,000 to about 35,000.

The preferred low molecular weight copolymer is 2-propenoic acid, 2-methyl polymer with ethenylbenzene, ethyl 2-propenoate, methyl 2-methyl-2 propenoate and 1,2-propane diol mono (2-methyl-2 propenate), available commercially from Interpolymer Corporation as Syntran 1560.

Both the high molecular weight as well as the low molecular weight acrylic polymers used herein are generally in the form of 20 to about 45 weight percents solids emulsion of the polymer in waters preferably from about 25 to about 35 weight percent of solids emulsion in water. The amount of the low molecular weight polymer can vary from about 10 to about 30 weight percent, and the amount of the low molecular weight polymer can vary from about 0 to about 5 weight percent based on the weight of the final composition.

The coalescent agent (solvent) used in the present invention is usually diethylene glycol monomethylether (DM), diethylene glycol monopropyl ether (DPMN), or a mixture thereof, used in an amount of about 4 to about 8 weight percent of the final composition.

Plasticizers are also conveniently included in the polymer in the amount of about 1 to about 3 weight percent based on the weight of the final composition. A particularly effective plasticizer for the purpose of this invention is tributoxy butyl phosphate (available commercially as KP 140 from FMC Corporation, Philadelphia, Pa.) but other plasticizers may be used in place of, or in combination with tributoxy butyl phosphate, which include dibutyl phthalate.

The floor finishing composition of this invention may, optionally, include a wax in order to increase the slip resistance of the polymeric film coating. A suitable wax for the purpose of this invention is a non-ionic water emulsion of Epolene (maleated polypropylene), or a blend of Epolene and high density polyethylene emulsion. When a wax is used, it is generally used in an amount varying from about 1 to about 10 weight percent, preferably from about 3 to about 5 weight percent based on the total weight of the resulting composition.

The composition of this invention also includes a small amount of a wetting agent, a biocide (preservative) and a defoamer.

A particularly effective wetting agent for use in the present invention is potassium fluoroalkyl carboxylate available commercially as FC 129 from The 3M Company, St Paul, Minn. It is used in an amount varying from about 0.5 to about 2 weight percent, based on the total weight of the final composition.

A suitable biocide (preservative) used herein is a mixture of 5-chloro-methyl-isothiazialone-3-one with 2-methyl-4-isothiazialone-3-one, used in an amount varying from about 0.10 to about 0.2 weight percent, based on the total weight of the final composition. This biocide is available commercially as Kathon from Rohm & Haas, Philadelphia, Pa. The inclusion of a biocide helps protect the composition from bacterial and fungal microbes.

The inclusion of a small amount of defoamer, usually from about 0.01 to about 0.03 weight percent, based on the total weight of the final composition helps break away any bubbles that may be formed during preparation of the polymeric polish composition of this invention. An effective defoamer is dimethylpolysiloxane available commercially from Silicone Corporation, Adrien, Minn. as SW-211.

An essential ingredient of the floor finishing composition of this invention is a stilbene compound used in an amount varying from about 0.05 to about 0.3 weight percent preferably from about 0.1 to about 0.2 weight percent, based on the total weight of the final composition.

The stilbene compound useful herein is selected from the group consisting of 2,2'-(1,2-ethenediyl) bis [5-[[4,6-bis[[2-(2-hydroxyethoxy)ethyl)amino]-1,3,5-triazin-2-yl]amino] benzenesulfonic acid disodium salt; 2,2'-(1,2-ethenediyl)bis [5-[[4-methylamino)-6-(phenylamino)-1,3,5,-triazin-2-yl] amino]benzenesulfonic acid; 2,2'-(1,2-ethenediyl)bis[5-[[4-[bis(2-hydroxyethyl)amino]-6-(phenylamino)-1,3, 5-triazin-2-yl]amino]benzenesulfonic acid; 2,2'-(1,2-ethenediyl)bis [5-[[4-[bis(2-hydroxyethyl)amino]-6-{(4-sulfophenyl) amino]-1,3,5 triazin-2-yl]amino]-benzenesulfonic acid tetrasodium salt; 2,2'-(1,2-ethenediyl)bis [5-(4-phenyl-2H-1,2,3-triazol-2-yl)]benzenesulfonic acid and, 2,2'-(1,2-ethenediyl) bis[5-[[4-(4-morpholinyl)-6-(phenylamino)-1,3, 5-triazin-2-yl]amino]benzenesulfonic acid disodium salt.

The preferred stilbene compound is benzenesulfonic acid, 2,2¹-(1,2-ethenediyl)bis [5-[[4,6-bis[[2-(2-hydroxyethoxy) ethyl)amino]-1,3,5-triazin-2-yl]amino]-disodium salt, available commercially as TX from Bayer Corporation, Pittsburgh, Pa.

These compounds are usually added to the acrylic polymer wet finish in the form of solid particles to produce a coherent, durable, tough, slip resistant and uniform film on the floor surface. While not wishing to be bound or limited to any particular theory or mechanism, it is believed that when these stilbene compounds are included to the acrylic polymer wet finish, the solid particles settle in and fill the voids between the polymer molecules and the wax particles (when a wax is included in the formulation), and result in the formation of a more coherent, uniform and durable coating with a permanent floss and a high degree of slip resistance for a long period of time. These attributes contribute to the commercial attractiveness of these compositions for floor coating and finishing purposes after the water is driven off from the composition.

The floor polish composition of the present invention is prepared by mixing the various ingredients, sequentially or simultaneously, in a suitable vessel, while agitating the mixture continuously, usually at room temperature and pressure. After the formulation is complete, the resulting composition is stored in a suitable container and applied to the floor when required.

In use, the composition is applied to the floor surface using a suitable synthetic or cotton mop to form a uniform film on the surface. It may be applied in one or more coating to obtain the desired film thickness and allowed to cure, usually for about 24 hours. After the coating is cured, it is burnished using a high speed (1500–2000 RPM) electric or propane burnisher equipped with a pad to produce the desired durability and gloss.

The advantages of the composition of the present invention for coating different floor surfaces are demonstrated in the following examples which are for illustrative purpose only, and not by way of any limitation. In the examples all percentages are on weight bases.

EXAMPLE 1

| Components | Weight % |
| --- | --- |
| Water | 28.07 |
| DM | 6.00 |
| KP-140 | 1.70 |
| Syntran 1270[1] | 45.60 |
| Syntran 1560[2] | 2.80 |
| Poly Emulsion 32543N37 wax (48%) | 14.00 |
| FC-120 | .79 |
| Kathon | .03 |
| SW-211 | .02 |
| Additive TX (20%) | .99 |
| | 100.00 |

[1] 38% solids
[2] 25% solids

EXAMPLE 2

| Components | Weight % |
| --- | --- |
| Water | 28.07 |
| DM | 6.00 |
| KP140 | 1.70 |
| Syntran 1270 | 45.60 |
| Syntran 1560 | 2.80 |
| Poly Emulsion 32543N37 wax (48%) | 9.60 |

-continued

| Components | Weight % |
|---|---|
| Chemcor 40[1] | 4.40 |
| FC 129 | .79 |
| Kathon | .03 |
| SW-211 | .02 |
| Additive TX (20%) | .99 |
| | 100.00 |

[1] wax available from Chemical Corporation of America, Chester, New York

EXAMPLE 3

| Components | Weight % |
|---|---|
| Water | 22.86 |
| DM | 6.00 |
| KP140 | 1.60 |
| Syntran 1270 | 44.00 |
| Syntran 1560 | 2.90 |
| Poly Emulsion 43N40 wax (48%) | 14.60 |
| FC-129 | 7.00 |
| Kathon | .03 |
| SW-211 | .02 |
| Additive TX (20%) | .99 |
| | 100.00 |

EXAMPLE 4

| Components | Weight % |
|---|---|
| Water | 31.86 |
| DPM | 5.90 |
| KP-140 | 1.50 |
| Syntran 1270 | 41.17 |
| Syntran 1560 | 2.50 |
| Epolene | 6.00 |
| Chemcor 40 | 9.40 |
| SW-211 | 0.04 |
| Kathon | 0.04 |
| FC-129 | 0.60 |
| Additive BBH[1] (20%) | 0.99 |
| | 100.00 |

[1] benzenesulfonic acid, 2,21-(1,2-ethenediyl) bis[5-[[4-[bis(2-hydroxyehtyl)amino]-6-(phenylamino)-1,3,5-triazin-2-yl]amino, available from Bayer Corporation of America, Pittsburgh, PA.

The compositions of Examples 1–4 were field tested and evaluated relative to a well known commercial formulation and the results are discussed below.

Field Tests

Three coats of each composition were applied to a vinyl terrazo test area and allowed to cure for 24 hours at room temperature. The coated floor was buffed with a propane burnisher at high speed (1500–3000 rpm). For daily maintenance the finished floor was washed only with water and again burnished at high speed.

Three coats of composition of Example 1 were applied to a vinyl floor around four cashier areas in a supermarket, and another cashier area at the same supermarket was coated with a control formulation (a commercially available floor finishing compound).

The initial gloss of the area coated with control the formulation of Example 1 greater than the initial gloss of the areas coated with the control compositions.

The coated film obtained from the application of the composition of Example 1 was very tight and hard whereas the coated film obtained with the control was not nearly as tight or hard.

The coated film obtained with the control was worn after 5 weeks of traffic and the floor areas had to be recoated. The coated film in the areas coated with the composition of Example 1 showed no signs of wear after the same period and its gloss and durability remained excellent after 7 months without the need for recoating. The scratches and scuff marks were minimal and were readily removed by buffing.

The composition of Example 2 was tested on a black vinyl floor of the cafeteria of a known university.

Three coats were applied to an area of the cafeteria around the entrance door. The remaining area was not coated. The area coated with the composition of Example 2 was washed with water only. The coated film obtained from using composition of Example 2 had about 15% higher gloss than the uncoated area and did not show sign of wear after 7 months of normal traffic as compared to the remaining area which showed sign of wear after 2 months.

In another test, a terrazzo floor around the cashier area of the headquarters of a major soda company was treated by applying one coat of a known industrial followed by two coats of the composition of Example 3. The coated floor was washed with water and buffed every night. The resulting coated floor exhibited excellent gloss after 2 months of traffic. After this period, the floor was washed with water in order to increase its gloss from 70 to 80. The coated floor also exhibited excellent durability and wear resistance in about 90% of the coated area except for a small area around the cashier which showed some minimal wear after 7 months.

In still another test, the hallway of a dormitory of a major university was coated with the composition of Example 4. The hallway floor was light green vinyl tiles. Three medium coats were applied to the stripped vinyl floor, allowed to dry for 24 hours and buffed 2 days. The gloss increased from 60 to 78. The finished floor exhibited excellent gloss of 78 based on average of 10 readings, and the tiles showed remarkable durability and very few scuff marks after 5 months of normal use.

In the following tests, 3 coats of formulations 1, 2, 3 and 4 were applied to four separate tiles (same composition) and allowed to cure for 24 hours. The finished coatings were unbuffed and each coated tile was tested as shown in the following table.

TABLE

| TESTS | FORM. 1 | FORM. 2 | FORM. 3 | FORM. 4 |
|---|---|---|---|---|
| 60 gloss ASTM/Black vinyl/white vinyl | 46/78/69 | 48/84/67 | 45/81/67 | 46/78/66 |

TABLE-continued

| TESTS | FORM. 1 | FORM. 2 | FORM. 3 | FORM. 4 |
|---|---|---|---|---|
| Sward-Rocker initial hardness | 27 | 18 | 21 | 21 |
| Black heel mark resistance | excellent | excellent | excellent | excellent |
| Detergent resistance | 1.01 | 1.01 | 1.01 | 1.01 |
| Slip resistance | very good-excellent | very good | very good | very good-excellent |
| 24 Hr Water Spot | .61 | .53 | .54 | .53 |
| Initial | excellent | excellent | excellent | very good |
| Final | excellent | excellent | excellent | excellent |
| Powder resistance | excellent | excellent | excellent** | excellent |
| Removability | fair | fair | fair | fair |
| Crazing | none | none | none | none |
| Leveling | fair to good | fair to good | good | good |
| Depth of gloss | good-very good | excellent | excellent | good |
| Solids | 24% | 23.4% | 25% | 22.5% |

**Formula 3 showed powdering when tested in the field with any pad

BENCH TEST PROCEDURES

Application

Sample of test finishes are applied to the tile substrate at the rate of 500 square feet per gallon by Method D of ASTM D 1436-2, unless otherwise specified.

60 Degree Specular Gloss—ASTM D 1455-82

The test finish is applied to an Official Test Vinyl Composition Tile. After twenty-four hours drying time, 5 readings are taken with a glossmeter. The average of these readings is reported.

Depth of Gloss

The Depth of Gloss is a subjective evaluation of a heavy film on Black Official Test Vinyl Tile. Visual examination of the film is made approximately perpendicular to the tile. Relative blackness of the tile and any evidence of haze or incompatibility are noted.

Leveling

The dried film on Black Official Test Vinyl is examined for evidence of pulling in form the edges, streaking, mottling and cratering.

Recoatability—ASTM D 3153-78

A dried film on Black Official Test Vinyl Tile is recoated after 30 minutes drying time. The degree of initial discoloration is noted. The dry second coat is examined for gloss improvement and damage to the first coat.

Water Spotting-ASTM D 1793-82

A film on Black Official Test Vinyl Composition Tile is aged for twenty-four hours at 70° F.-50% RH. The film is spotted with water for one hour. The extent of initial discoloration is observed. After blotting excess water from the film, it is allowed to dry and then examined for loss of gloss and film damage.

Rubber Heel Mark Resistance—SCMA Bulletin No. 9-73

Two coats of the test finish are applied to White Official Test vinyl Composition Tile by Method B of ASTM D 1436-64. After drying for twenty-four hours at 70° F.-50% RH, the tile is run for 250 revolutions in a Snell Capsule. The results are reported as percentage of the surface covered with black marks.

Powdering Resistance—ASTM D 2048-82

A film on Official Test Vinyl Composition Tile is allowed to age for twenty-four hours at 70° F.-50% RH. The film is subjected to 50 cycles on a Textile Crockmeter. The amount of powdering is evaluated visually.

Crazing

The finish is applied to a black rubber tile and after drying is examined for film discontinuities and cracking.

Removability—ASTM D 1792-82

The film on Black Official Test Vinyl Composition Tile is aged overnight in a 52° C. oven. The film is scrubbed with an abrasive paid soaked in a 2% standard stripping solution using a Gardner Straight Line Washability and Abrasion Machine. The finish is rated by the number of strokes necessary for removal on a scale of Excellent (<50) to Poor (>200).

Detergent Resistance—ASTM D 3207-82

A film on Black Official Test Vinyl Composition Tile is aged twenty-four hours at 70° F.-5-% RH and then is subjected to 100 and 200 cycles on a Gardner Straight Line Washability and Abrasion Machine using a standard detergent solution. The detergent resistance is evaluated by estimating the damage done to the film.

Sward Rocker Hardness

The rocker hardness reported is twice the number of swings obtained from a sward rocker when it is set in motion on a film coated on glass and aged for twenty-four hours at 70° F.-50% RH.

I claim:
1. A floor finishing composition comprising:
   (a) from about 20 to about 40 weight percent of zinc-containing relatively high molecular weight acrylic polymer having a molecular weight of from about 300,000 to about 1,800,000,
   (b) from about 10 to about 30 weight percent to zinc-free relatively low molecular weight acrylic polymer having a molecular weight of from about 5000 to about 70,000 and

(c) from about 0.05 to about 0.3 weight percent based on the total weight of the final composition of a stilbene compound selected from the group consisting of 2,2'-(1,2-ethenediyl)bis[5-[[4,6-bis[[2-(2-hydroxyethoxy)ethyl)amino]-1,3,5-triazin-2-yl]amino]benzenesulfonic acid disodium salt; 2,2'-(1,2-ethenediyl)bis[5-[[4-methyl amino)-6-(phenylamino)-1,3,5,-triazin-2-yl]amino]benzenesulfonic acid; 2,2'-(1,2-ethenediyl)bis[5-[[4-[bis(2-hydroxyethyl)amino]-6-(phenylamino)-1,3,5-triazin-2-yl]amino]benzenesulfonic acid; 2,2'-(1,2-ethenediyl)bis[5-[[4-[bis(2-hydroxyethyl)amino]-6-riazin-2-yl]amino]benzenesulfonic acid tetrasodium salt; 2,2'-(1,2-ethenediyl)bis [5-(4-phenyl-2H-1,2,3-triazol-2-yl)benzenesulfonic acid and, 2,2'-(1,2-ethenediyl)bis[5-[[4-(4-morpholinyl)-6-(phenylamino)-1,3,5-triazin-2-yl]amino]benzenesulfonic acid disodium salt, all percents being based on the total weight of the final floor finishing composition.

2. A floor finishing composition as in claim 1 wherein the molecular weight of the high molecular weight acrylic polymer is from about 400,000 to about 1,600,000, and molecular weight of low molecular weight acrylic polymer is from about 10,000 to about 35,000.

3. A floor finishing composition as in claim 1 wherein the amount of said stilbene compound is from about 0.1 to about 0.2 weight percent based on the total weight of the final composition.

4. A floor finishing composition as in claim 2 wherein the amount of said stilbene compound is from about 0.1 to about 0.2 weight percent based on the total weight of the final composition.

5. A floor finishing composition as in claim 1 further including from about 1 to about 3 weight percent based on the total weight of the final composition of a wax compound selected from the group consisting of maleated polypropylene, or a blend of maleated polypropylene and high density poylethylene.

6. A floor finishing composition as in claim 2 further including from about 1 to about 3 weight percent based on the total weight of the final composition of a wax compound selected from the group consisting of maleated polypropylene, or a blend of maleated polypropylene and high density poylethylene.

7. A floor finishing composition as in claim 3 further including from about 1 to about 3 weight percent based on the total weight of the final composition of a wax compound selected from the group consisting of maleated polypropylene, or a blend of maleated polypropylene and high density poylethylene.

8. A floor finishing composition as in claim 4 further including from about 1 to about 3 weight percent based on the total weight of the final composition of a wax compound selected from the group consisting of maleated polypropylene, or a blend of maleated polypropylene and high density poylethylene.

* * * * *